No. 612,151. Patented Oct. 11, 1898.
E. F. BELL.
WATER FILTER.
(Application filed Nov. 13, 1897.)
(No Model.)
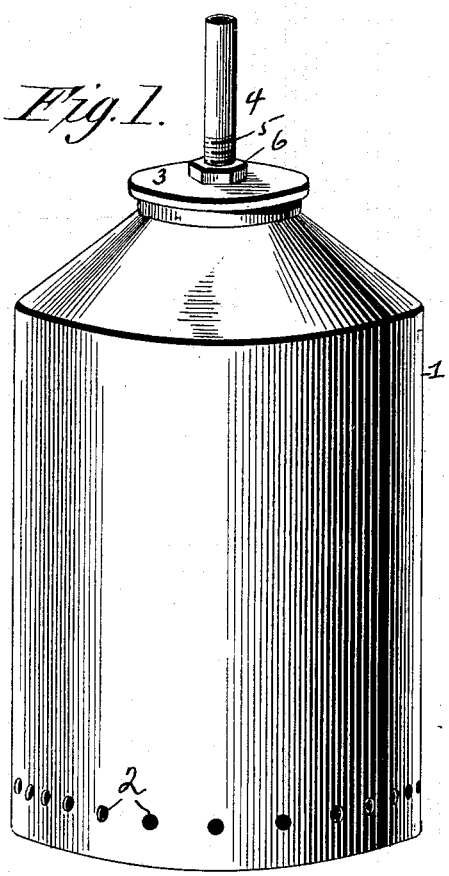
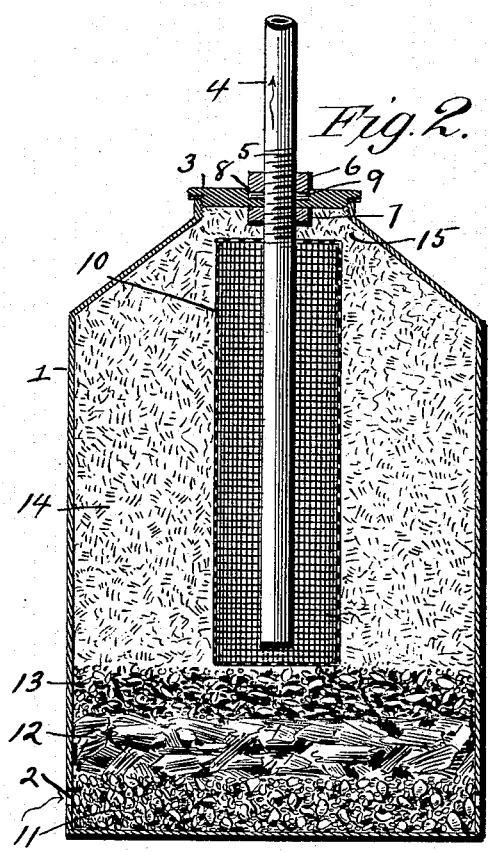
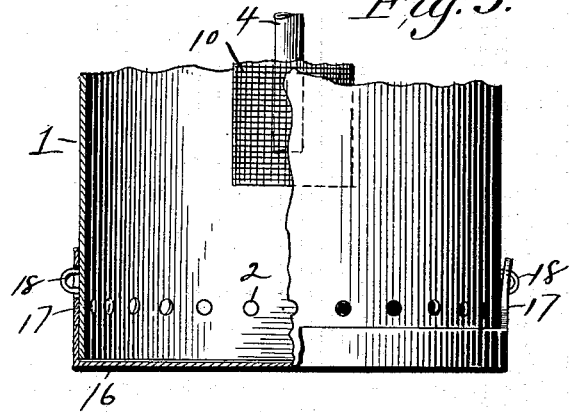
Emil Franklin Bell, Inventor
By Glasscock
Attorney
Witnesses
L. C. Hills
G. E. Warner

UNITED STATES PATENT OFFICE.

EMIL FRANKLIN BELL, OF CHEROKEE, IOWA.

WATER-FILTER.

SPECIFICATION forming part of Letters Patent No. 612,151, dated October 11, 1898.

Application filed November 13, 1897. Serial No. 658,405. (No model.)

*To all whom it may concern:*

Be it known that I, EMIL FRANKLIN BELL, a citizen of the United States, residing at Cherokee, in the county of Cherokee and State of Iowa, have invented certain new and useful Improvements in Water-Filters; and I do hereby declare the following to be a full, clear, and exact description of the invention, such as will enable others skilled in the art to which it appertains to make and use the same.

My invention has relation to filters adapted to be attached to the lower ends of pipes connected with pumps, the filter being submerged beneath the surface of the water in the well, the filter being so constructed as to practically surround the lower end of said pipe, the filter containing suitable filtering material, such as gravel and charcoal, and being so constructed as to be readily removable from the end of the pipe, and also having a removable cap, whereby the contents of the filter may be taken out or put in, as may be required.

In the accompanying drawings, Figure 1 is a perspective view of the filter. Fig. 2 is a transverse sectional view of the filter; and Fig. 3 is a perspective view, partly in section, of the lower portion of the filter.

A casing 1 is provided near its lower end and in its side with a series of perforations 2. The said casing is made, preferably, of galvanized iron or any other material that will not rust or corrode when placed in contact with water. The top of the casing is provided with a removable cap 3, said cap being preferably screw-threaded into the top of the casing 1, as shown in Fig. 2. The pipe 4 is connected at its upper end with a pump. It being deemed unnecessary to illustrate the pump in the drawings, therefore it is not shown. The lower portion of the pipe 4 is provided with an external thread 5, and the jam-nuts 6 and 7 are adapted to engage the said thread 5. The top of the cap 3 is provided with a central recess 8, in which is located a packing or washer 9. The jam-nuts 6 and 7 are adapted to come in contact with the upper face of the washer 9 and the under face of the cap 3, respectively, as shown in Fig. 2. The cylindrical screen 10 is located in the interior of the casing 1. Said screen may be supported by the material within said casing 1, or the said screen may be attached by means of arms (not shown in the drawings) connecting the inner sides of the casing 1. The lower end of the pipe 4 is open and terminates near the bottom of the screen 10. A layer of gravel 11 is located in the bottom of the casing, said layer extending above the perforations 2. On top of the layer 11 is placed a layer of coarse charcoal 12, and on top of this layer is placed a second layer of gravel 13, the fine charcoal 14 surrounding the screen 10 and extending to the top of the casing 1. Thus it will be seen that as the pump elevates the water through the pipe 4 the water in the well passes into the casing 1 through the perforations 2, is partially filtered through the gravel 11, thence passes through the coarse charcoal 12 and is still further filtered, thence passes through the gravel 13 and is also filtered, and thence passes through the fine charcoal, thus completing the course of filtration. The water then passes through the screen 10 and passes up through the pipe 4.

In assembling the parts the layer of gravel 11 is first put in the casing 1. Then the layer of coarse charcoal 12 is put in and then the layer of gravel 13 is put in. Then sufficient fine charcoal is put in to cover the upper surface of the layer 13. The screen 10 is then put in place, and the fine charcoal is introduced around the screen through the space 15, said space being at the upper edge of the said screen 10. The cap 3 is then secured in its proper position upon the pipe 4 by means of the jam-nuts 6 and 7, and then by revolving the casing 1 and its contents the thread in the top of the said casing is caused to engage the thread of the cap 3, thus making a pipe-joint between the cap and the casing, the washer 9 preventing any water from entering the casing through the point of connection between the cap 3 and the pipe 4.

In the form of the invention shown in Fig. 3 the lower end of the casing 1 is provided with a removable bottom 16, said bottom having the perforated strip 17, the perforations of the strip 17 being adapted to receive the staples 18 or other suitable offsets attached to the sides of the casing 1, and thus the bottom 16 is held in position upon the lower end of the casing 1.

The construction shown in Fig. 3 is to be used when it is desirable to introduce the filtering material after the other parts have been assembled into their proper relation to each other.

Having thus described my invention, what is claimed as new, and desired to be secure by Letters Patent, is—

1. A filter consisting of a casing adapted to be located at and surround the end of the suction-pipe, said casing having suitable perforations adapted to permit the ingress of water, suitable filtering material located within the casing, a screen located within the casing, said screen surrounding the end of the suction-pipe, a removable cap adapted to close the upper end of the casing, sufficient space being left between the upper end of the screen and the top of the casing to permit the introduction of the filtering material.

2. A filter consisting of a casing adapted to be located at and surround the end of the suction-pipe, said filter having suitable perforations adapted to permit the ingress of water, suitable filtering material located within the casing, a screen located within the casing and surrounding the suction-pipe, a removable cap adapted to close the upper end of the casing, jam-nuts located on the suction-pipe and adapted to bear against the opposite faces of the cap.

3. A filter consisting of a casing adapted to be located at and surround the end of the suction-pipe, said casing having suitable perforations adapted to permit the ingress of water, suitable filtering material located within the casing, a screen located within the casing and surrounding the end of the suction-pipe, a removable cap adapted to close the upper end of the casing, said cap having a recess containing a suitable packing, jam-nuts located on the suction-pipe and adapted to come in contact with the packing and opposite sides of the cap.

4. A filter consisting of a casing adapted to be located at and surround the end of the suction-pipe, said casing having suitable perforations adapted to permit the ingress of water, suitable filtering material located within said casing, a removable bottom located on the casing, perforated strips attached to said bottom, the said perforations on the said strips being adapted to receive suitable offsets on the side of the casing and thereby retain the bottom in its proper position upon the casing.

In testimony whereof I affix my signature in presence of two witnesses.

EMIL FRANKLIN BELL.

Witnesses:
LONDON MYERS,
E. C. HENICKE.